Figure 1:
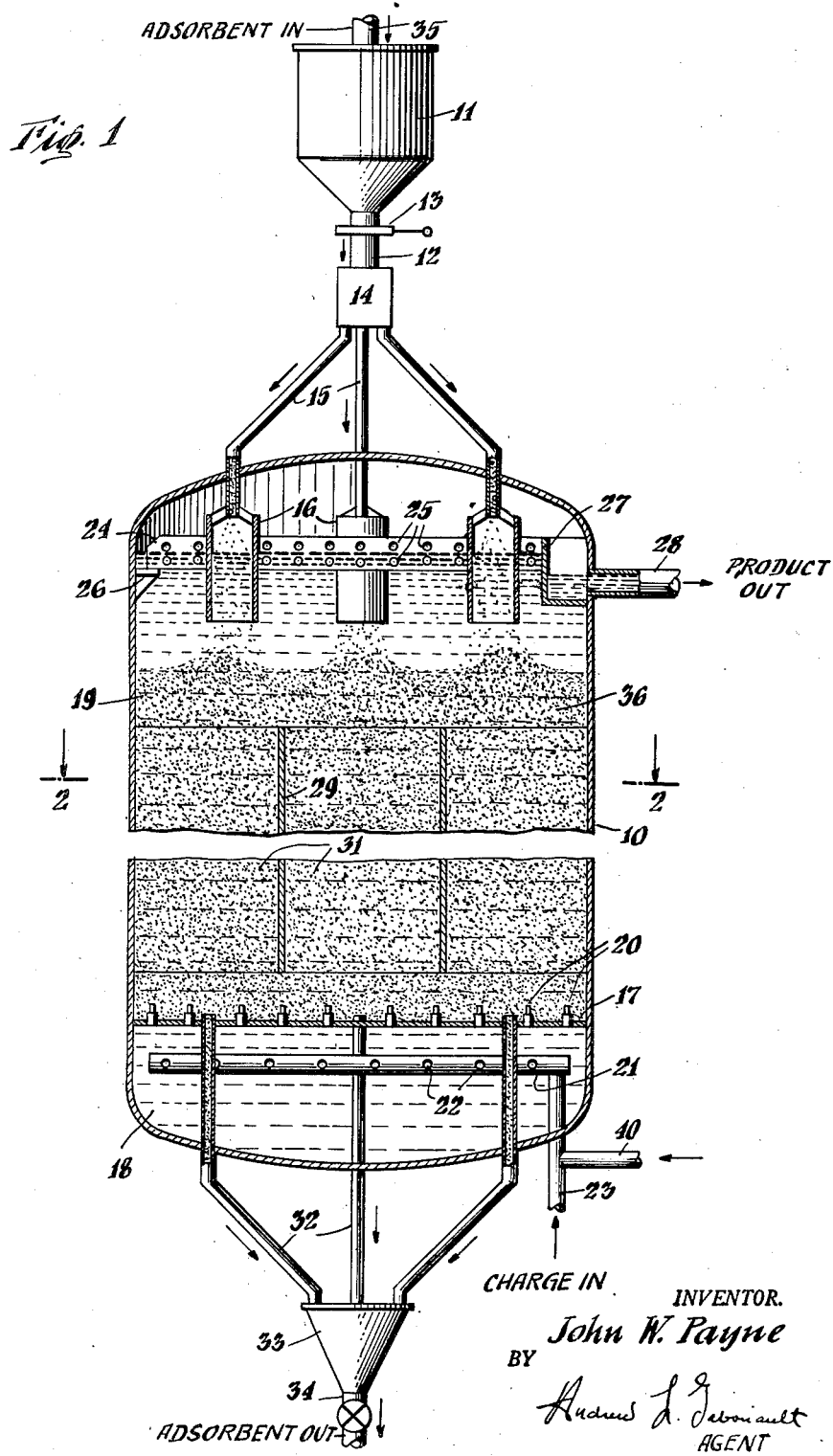

Feb. 12, 1957  J. W. PAYNE  2,781,301
METHOD FOR PURIFYING LIQUID HYDROCARBONS WITH SOLID ADSORBENTS
Filed Feb. 20, 1952  2 Sheets-Sheet 1

INVENTOR.
John W. Payne
BY
Andrew L. Jabonault
AGENT

Feb. 12, 1957  J. W. PAYNE  2,781,301
METHOD FOR PURIFYING LIQUID HYDROCARBONS WITH SOLID ADSORBENTS
Filed Feb. 20, 1952  2 Sheets-Sheet 2
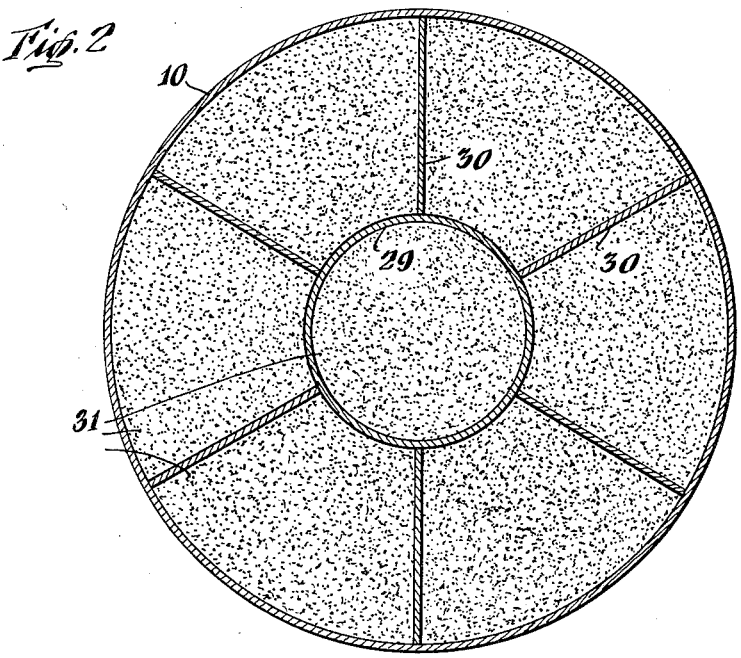
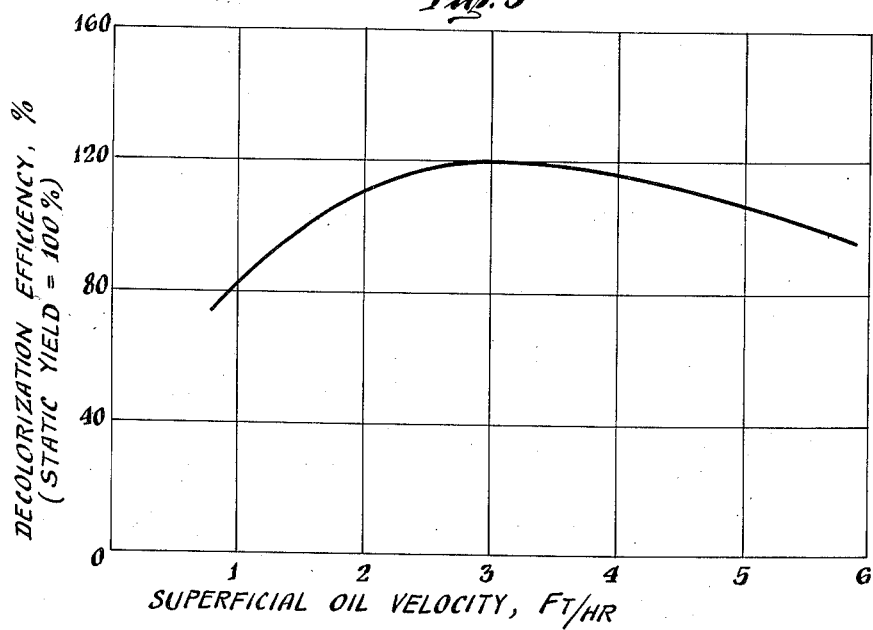
INVENTOR.
John W. Payne
BY
Andrew L. Jaboriault
AGENT United States Patent Office 2,781,301
Patented Feb. 12, 1957

2,781,301

METHOD FOR PURIFYING LIQUID HYDROCARBONS WITH SOLID ADSORBENTS

John W. Payne, Woodbury, N. J., assignor to Socony Mobil Oil Company, Inc., a corporation of New York Application February 20, 1952, Serial No. 272,584

2 Claims. (Cl. 196—147)

This invention has to do with an improved method and apparatus for treating liquid oils with solid adsorbents for the purpose of removing small amounts of impurities or undesirable contaminants therefrom so as to provide a single purified oil product as distinguished from extraction and deasphalting processes and the like in which oils are fractionated into two or more liquid products.

Typical of the processes to which this invention applies is the continuous purification of a liquid lubricating oil of low asphalt content and containing small amounts of impurities by passing the oil upwardly through a downwardly gravitating columnar mass of granular adsorbent. Among the purposes for which the oil may be treated are decolorization, neutralization, removal of suspended, colloidal or dissolved impurities such as carbon or coke or oxygen and nitrogen containing impurities and other gum forming compounds, and improvement of the demulsibility properties of the oil. This invention may also be applied to the treatment of vegetable oils and the like.

The adsorbent employed should be made up of palpable particles of size within the range about 4–100 mesh and preferably 10–60 mesh and still more preferably 15–30 mesh by Tyler Standard Screen Analysis. The particles may take the form of pellets, capsules, pills, spheres or the like or granules of irregular shape such as are obtained from grinding and screening. The terms "adsorbent in palpable particulate form" and "palpable particle form adsorbents" as employed in describing and in claiming this invention are intended to generically cover particles of any or all of these shapes having substantial size as distinguished from finely divided powders. The pore size of the preferred adsorbents is such that while micropores are present, substantially more than 30 percent of the pore volume and preferably more than 60 percent of the total pore volume is occupied by macropores (i. e., pores having radii greater than 100 Angstrom units). Typical adsorbents which may be employed are fuller's earth, bauxite, bentonite and bone char, charcoal, magnesium silicate, heat and acid activated kaolin and activated carbon. Synthetic silica or alumina or silica-alumina gel adsorbents and the like may be employed but preferably the preparation thereof should be controlled to provide a pore structure similar to clay type adsorbents wherein substantially more than 30 percent of the total pore volume is occupied by macropores. It should be understood, however, that by proper control of the operating conditions, adsorbents of the synthetic gel type or otherwise, having mostly micropores and less than 30 percent macropores, may be employed in this invention although with somewhat inferior results when used for lubricating oil purification. On the other hand, gels of this latter type have been found to give superior results in the treatment of distillate fuel oils by the method of this invention. The invention is intended to cover, in its broadest form, adsorbents of this type as well as preferred adsorbents of larger pore structure.

In percolation processes of the aforementioned type, it is generally desirable to pass the liquid oil charge upwardly through a downwardly gravitating columnar mass of adsorbent contact material. When the treating vessel is of large horizontal cross-sectional area, as is desirable in commercial operations, it has been found that there is a tendency for the contact material to back-mix or cycle. Back-mixing may be defined as the washing back of contact material in the direction of liquid flow in localized areas of the treating zone. This back-mixing results in inferior treatment of the liquid charge since it destroys the countercurrent flow, in at least a portion of the contact material bed, which is optimum for efficient operation. In addition it has been determined that if the velocity with which the oil charge is passed through the adsorbent is not controlled within a fixed range a reduction in the efficiency with which the undesirable impurities are removed from the liquid oil occurs.

A major object of this invention is to provide a method and apparatus for the removal of undesirable impurities from a liquid oil with a granular adsorbent contact material which overcomes the above-described difficulties.

Another object of this invention is to provide a method and apparatus for the removal of small amounts of undesirable impurities from a liquid mineral oil of low asphalt content with an adsorbent of palpable particulate form in which liquid oil charge is passed upwardly through a downwardly gravitating columnar mass of adsorbent without undesirable back-mixing.

Another object is to provide a high efficiency method for the purifying of liquid hydrocarbon oils of low asphalt content with a granular adsorbent contact material.

These and other objects of the invention will be apparent from the following discussion of the invention.

This invention provides for a process and apparatus for the treatment of liquids in which a bed of granular contact material is maintained within a confined treating zone. The contact material in this bed is gravitated downwardly as a columnar mass. The bed is divided into a plurality of laterally confined regions or columns of contact material extending downwardly from a level below the upper surface of the bed by means of a plurality of spaced apart vertical partitions, the upper section of the bed extending completely across the treating zone. The maximum lateral distances across any of these regions are fixed to a value below that at which excessive back-mixing occurs. A liquid oil charge of low asphalt content is passed upwardly through the bed to effect the removal of undesirable impurities therefrom by the adsorbent. Liquid product is removed from the upper section of the treating zone. Fresh contact material is supplied to the upper section of the bed while used contact material is removed from the lower section of the bed. In more preferred forms, the regions within the adsorbent bed do not extend to the bottom of the bed but terminate a distance thereabove. Also in preferred forms of the invention the superficial velocity of liquid charge through the treater is controlled within an optimum range.

This invention is best understood by reference to the attached drawings of which, Figure 1 is an elevational view, partially in section, showing the application of this invention to a process for the continuous treatment of liquid hydrocarbon oils with granular adsorbents, Figure 2 is a sectional view taken along line 2—2 of Figure 1, and Figure 3 is a graph showing the relationship between treating efficiency and superficial oil rate.

All of these figures are diagrammatic in form and like parts in all bear like numerals.

The invention will be best understood by considering Figures 1 and 2 together. There is shown therein a confined treating vessel 10 with a supply hopper 11 thereabove. A conduit 12 with slide valve 13 therein extends downwardly from hopper 11 into a distributing device 14 which is adapted to supply adsorbent to vessel 10 at a plurality of spaced apart points across the upper section of vessel 10. A suitable distributing device is described and claimed in U. S. patent application Serial No. 237,264, filed July 17, 1951, now Patent No. 2,745,795. A plurality of contact material introduction conduits 15 extend from distributing device 14 and terminate within the upper section of vessel 10. Attached to the end of each of conduits 15 are soaking tubes 16 which may take the form of conduits of larger cross-sectional area than conduit 15. Suitable soaking tubes are described and claimed in U. S. patent application Serial No. 237,268, filed July 17, 1951, now Patent No. 2,749,290. The lower ends of tubes 16 terminate at horizontally spaced apart points on a common level within the upper section of vessel 10. A horizontal partition 17 extends transversely across the lower section of vessel 10 so as to divide into a treating chamber 19 thereabove and a liquid plenum chamber 18 therebelow. A plurality of liquid injection nozzles 20 are spaced across partition 17. Suitable nozzles are described and claimed in U. S. patent application Serial No. 237,265, filed July 17, 1951. A liquid distributor 21 having orifices 22 spaced horizontally therein extends across plenum chamber 18. A liquid charge conduit 23 connects into distributor 21 and a charge conduit 40 for recycle oil connects into 23. Extending across the upper section of treating chamber 19, at a level substantially above the lower end of conduits 16, is a liquid withdrawal channel 24 having a plurality of spaced apart orifices 25 therein. One end of channel 24 rests on support 26 while the opposite end is connected into withdrawal chamber 27. A withdrawal conduit 28 extends outwardly from chamber 27. This system of liquid withdrawal is described and claimed in U. S. patent application Serial No. 265,832, filed January 10, 1952. A partition in the shape of a hollow upright cylinder 29 of lateral dimensions less than chamber 19 is fixed along the center line of chamber 19 and extends from a level substantially below the bottom of conduits 16 to a level substantially above partition 17 and withdrawal conduits 32. A plurality of spaced apart substantially vertical partitions 30 extend radially outwardly from the outer periphery of cylinder 29 to the inner periphery of chamber 19. Partitions 32 are of the same height as partition 29 and terminate at the same level. Partitions 29 and 30 define a plurality of compartments 31 within chamber 19. A plurality of adsorbent withdrawal conduits 32 extend from chamber 19 from horizontally spaced apart points on a common level substantially below the lower ends of partition 30 and cylinder 29. These conduits connect into a common receptacle 33 with conduit 34 extending from its lower end.

In operation adsorbent of palpable particulate form is supplied to hopper 11 by means of passage 35. Slide valve 13 is normally kept open. Adsorbent gravitates from the bottom of hopper 11 into distributor 14. Adsorbent is withdrawn from 14 by means of conduits 15 and passes into treating zone 19. The adsorbent is supplied to the upper surface of adsorbent bed 36 through soaking tubes 16. Tubes 16 are so placed that adsorbent is delivered equally to all of regions 31 within columnar mass 36. This is most easily accomplished by providing one of tubes 16 centrally above each of region. Partitions 29 and 30 act to subdivide the columnar mass of adsorbent into a plurality of laterally confined side by side regions or columns 31 through which adsorbent gravitates from a level below the upper surface of the adsorbent bed 36 to a level above the bottom of the bed.

By dividing the bed into laterally confined regions in this manner the tendency for back-mixing is reduced. The bed is not so divided at its upper end so that the bed will be maintained at a uniform depth across the horizontal cross-section of treating zone 19 by interchange of adsorbent across the bed at its upper end. Columns 31 do not extend to the bottom of bed 36 in more preferred forms of this invention so that there will be equal distribution of liquid charge and equal withdrawal of adsorbent from the lower section of bed 36 and all of regions 31. A liquid hydrocarbon charge which may be a fuel oil or mineral lubricating oil of low asphalt content is supplied to plenum chamber 18 through conduits 23 and 21 and orifices 22. Charge oil passes from the plenum chamber into the lower section of bed 36 at a level substantially below the lower ends of regions 31 by means of nozzles 20. The oil passes upwardly through bed 36 and passages 31 to effect the desired removal of small amounts of impurities or decolorization. The superficial velocity of the oil passing upwardly through the bed 36 is preferably controlled within a fixed range for most efficient removal of impurities as described hereinbelow. Liquid product is withdrawn from the upper section of the treating zone at a level above the upper surface of bed 36 by means of channel 24. The liquid product passes into chamber 27 and is removed through passage 28. Used adsorbent is removed from the lower section of treating zone 19 and equally from all of regions 31 by means of spaced conduits 32 and passes into receptacle 33 to promote downward movement of the adsorbent through the bed. Adsorbent is removed from receptacle 33 by means of conduit 34. Conduit 34 may connect into a suitable regeneration means wherein the adsorbent is reconditioned for reuse in the treating zone. Reconditioned adsorbent may be returned to the process through conduit 35. Before passage to the regeneration zone, the used adsorbent may be processed to remove any adhering oil therefrom. One system for accomplishing this is to wash the adsorbent with a suitable solvent, such as petroleum naphtha, to remove the liquid oil. The liquid oil may then be stripped from the solvent and returned to the treating zone with the liquid charge through conduit 40 which connects into charge conduit 23. This recycle oil is then recovered in the single product which is withdrawn through passage 28.

The various parts of the apparatus of this invention may, of course, take different forms than that shown and described above. Partitions 23 and 30 may consist of a plurality of vertical partitions extending across chamber 19 in directions 90 degrees removed from each other. Or a central partition like partition 29 may be provided in the shape of a rectangle, hexagon or the like from which partitions 30 extend. In any case, the maximum lateral or horizontal distance across any of regions 31 should be less than about 8 feet and preferably less than 6 feet. The entry to regions 31 should be below the upper surface of bed 36 by an amount which will allow free exchange of contact material across the bed but which will prevent excessive back-mixing in this upper section of the bed. This distance should generally be from about 6 inches to about 24 inches and preferably from about 12 inches to about 18 inches. The lower end of partitions 29 and 30 may extend to the bottom of chamber 19 in less preferred forms of this invention so that regions 31 extend to the bottom of bed 36. If this is done, careful spacing of liquid nozzles 20 and adsorbent withdrawal conduits 32 is required to insure uniform treatment in all of regions 31. Generally partitions 29 and 30, and therefore regions or columns 31, should terminate about 2 inches to 24 inches above the bottom of chamber 19 and bed 36 and preferably about 6 inches to 12 inches thereabove. Adsorbent withdrawal conduits 32 should extend from a common level substantially below the lower ends of regions 31 and should be so spaced that at least one withdraws adsorbent from each of the regions 31 and adsorbent is withdrawn equally and uniformly across bed 36. Liquid oil charge should be supplied uniformly to bed 36 from a plurality of horizontally spaced apart points on a common level substantially below regions 31. These points of introduction should be so spaced that liquid charge is delivered equally to regions 31.

Figure 3 illustrates the relationship between the superficial oil velocity in feet per hour and decolorization efficiency. The superficial oil velocity may be defined as the oil velocity through chamber 19 based on the cross-section of the chamber empty of adsorbent. The decolorization efficiency is determined by comparing the product at any given velocity with the product obtained from percolating a second equal quantity of the same oil through a static bed of the adsorbent. An 8-foot diameter treater was used to determine this curve. It will be noted that the treating efficiency goes through a maximum at about 120 percent efficiency when the oil rate is about 3.1 feet per hour. From this curve, it is apparent that it is desirable to maintain the superficial oil velocity through the treating zone within fixed limits when the treating chamber has maximum lateral distances not in excess of 8 feet. Generally, the superficial oil velocity should be within the range about 1.5 to 5.5 feet per hour and preferably within the range about 2.5 to 4.5 feet per hour. This limitation is desirable not only when the treating chamber itself has maximum lateral dimensions not in excess of 8 feet but also when a larger treating chamber is partitioned into regions having maximum lateral dimensions not in excess of 8 feet as described hereinabove.

As an example of this invention, its application to a treating vessel used in the continuous treatment of liquid mineral oils of low asphalt content with an adsorbent will be discussed. The treating chamber was 19 feet 6 inches high and 14 feet 6 inches in diameter. The partitions consisted of a central cylindrical partition 5 feet 5 inches in diameter and six radial partitions extending therefrom to the wall of the treating vessel. The radial partitions were spaced 60 degrees apart. The top of the partitions was 6 feet from the top of the treating chamber and three feet from the lower ends of adsorbent introduction soaking tubes like conduits 16 of Figure 1. The top of the partitions was about 18 inches below the surface of adsorbent bed 36. The bottom of the partitions was 6 inches from the bottom of the treating chamber. This vessel was used to treat 2100 bbl. per day of lubricating oil. The adsorbent used was bauxite of a size about 15 to 30 mesh Tyler and was charged at a rate of 3 tons per hour.

This invention should be understood to cover all changes and modifications of the example of the invention herein chosen for purposes of disclosure which do not constitute departures from the spirit and scope of the invention.

What is claimed is:

1. A continuous process for the decolorization of liquid mineral oils of low asphalt content with a palpable particle form adsorbent to remove small amounts of undesirable impurities from said oils, which comprises: maintaining a bed of said adsorbent as a downwardly gravitating columnar mass throughout the lower section of a confined treating zone, said bed having at least one horizontal dimension greater than 8 feet and said adsorbent being of a size within the range 10 to 60 mesh by Tyler Standard Screen Analysis; subdividing said bed downwardly from a level below the upper surface of said bed into a plurality of laterally confined side by side regions, the maximum horizontal distance across any one region being less than 8 feet; passing liquid mineral oil upwardly through said bed at a superficial velocity within the range about 1.5 to 5.5 feet per hour to effect removal of the undesirable impurities therefrom; removing purified liquid mineral oil from the upper section of said treating zone above the upper surface of said bed; removing used adsorbent together with adhering oil from the lower section of said bed; separating the adhering oil from the adsorbent and returning the oil so separated to the lower section of the bed.

2. A continuous process for the decolorization of liquid mineral oils with an adsorbent of palpable particulate form to effect removal of small amounts of color bodies from said oils, which comprises: maintaining a bed of adsorbent as a downwardly gravitating columnar mass within a confined treating zone, said bed having at least one horizontal dimension greater than 8 feet and said adsorbent being of a size within the range 10 to 60 mesh by Tyler Standard Screen Analysis; subdividing said bed from a level 12 to 18 inches below the upper surface of the bed to a level at least within 12 inches of the bottom thereof into a plurality of vertically extending side by side regions, the maximum lateral dimensions of all of said regions being less than 8 feet; introducing liquid mineral oil charge into the lower end of said bed and passing said charge upwardly through the bed at a superficial velocity within the range about 2.5 to 4.5 feet per hour, thereby effecting removal of the color bodies from the charge; removing decolorized liquid oil from the upper section of said zone at a level above the upper surface of said bed; supplying adsorbent to the upper section of said bed; removing used adsorbent with adhering oil from the lower section of said bed; removing substantially all of the adhering oil from said adsorbent and returning the oil so removed to the lower section of the treating zone.

References Cited in the file of this patent

UNITED STATES PATENTS

| | | |
|---|---|---|
| 1,620,431 | Bramwell | Mar. 8, 1927 |
| 2,394,814 | Snuggs | Feb. 12, 1946 |
| 2,412,135 | Evans | Dec. 3, 1946 |
| 2,430,420 | Evans | Nov. 4, 1947 |
| 2,472,976 | Hoover | June 14, 1949 |
| 2,552,435 | Knox et al. | May 8, 1951 |
| 2,552,436 | Bennett et al. | May 8, 1951 |
| 2,582,415 | Claussen | Jan. 15, 1952 |
| 2,594,289 | Caldwell | Apr. 29, 1952 |
| 2,617,708 | Peery | Nov. 11, 1952 |
| 2,701,786 | Evans et al. | Feb. 8, 1955 |